United States Patent [19]

Diery et al.

[11] 4,341,716
[45] Jul. 27, 1982

[54] POLYETHER POLYAMINES, THE SALTS THEREOF, PROCESS FOR THEIR MANUFACTURE AND THEIR USE

[75] Inventors: Helmut Diery, Kelkheim; Wolfgang Wagemann, Tremsbüttel; Joachim Weide, Kelkheim; Reinhold Deubel, Bad Soden am Taunus; Martin Hille, Liederbach, all of Fed. Rep. of Germany

[73] Assignee: Hoechst Aktiengesellschaft, Frankfurt, Fed. Rep. of Germany

[21] Appl. No.: 189,671

[22] Filed: Sep. 22, 1980

[30] Foreign Application Priority Data

Sep. 25, 1979 [DE] Fed. Rep. of Germany ....... 2938623
May 5, 1980 [DE] Fed. Rep. of Germany ....... 3017198

[51] Int. Cl.³ .................... C07C 93/04; C07C 91/10; C07C 91/12; C07C 89/02; C07C 143/68; C07F 9/09
[52] U.S. Cl. ................. 260/456 A; 252/193; 252/357; 252/358; 252/392; 252/403; 564/504; 564/506; 564/475; 564/505; 260/925
[58] Field of Search ............... 564/504, 505, 506, 508

[56] References Cited

U.S. PATENT DOCUMENTS

| | | | |
|---|---|---|---|
| 3,029,208 | 4/1962 | Khawam | 564/505 X |
| 3,200,155 | 8/1965 | Kirkpatrick et al. | 564/505 X |
| 3,301,888 | 1/1967 | Cyba | 564/506 X |
| 3,822,113 | 7/1974 | Keenan et al. | 564/505 X |
| 4,004,030 | 1/1977 | Scharrmann et al. | 564/506 X |
| 4,171,278 | 10/1979 | Andree et al. | 564/504 X |

*Primary Examiner*—John Doll
*Attorney, Agent, or Firm*—Connolly and Hutz

[57] ABSTRACT

Polyether polyamines of the formula 1

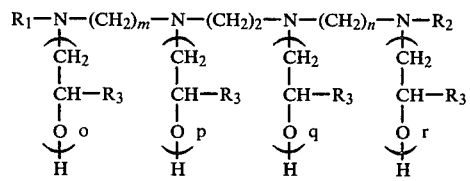

in which $R_1$ and $R_2$ are identical or different and denote $C_8$–$C_{30}$-alkyl, -2-hydroxyalkyl or -alkenyl or $C_8$–$C_{24}$-alkoxypropyl, m and n are 2 or 3, $R_3$ is hydrogen or methyl and the sum of $o+p+q+r$ is an integer from 4 to 600, process for their manufacture and their use as dispersing agents, corrosion inhibitors, demulsifiers and acid retarders.

4 Claims, No Drawings

POLYETHER POLYAMINES, THE SALTS THEREOF, PROCESS FOR THEIR MANUFACTURE AND THEIR USE

This invention relates to polyether polyamines of the formula 1

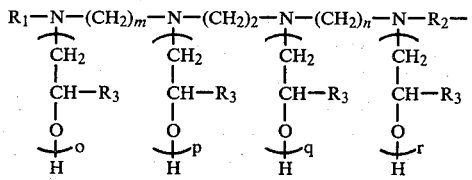

in which $R_1$ and $R_2$ are identical or different and denote $C_8$-$C_{30}$-alkyl, $C_8$-$C_{30}$-2-hydroxyalkyl or $C_8$-$C_{30}$-alkenyl or $C_8$-$C_{24}$-alkoxypropyl, m and n are 2 or 3, $R_3$ is hydrogen or methyl and the sum of $o+p+q+r$ is an integer from 4 to 600.

Preferred compounds of the formula 1 are those in which $R_1$ and $R_2$ are identical and denote $C_8$-$C_{18}$-alkyl, $C_8$-$C_{18}$-2-hydroxyalkyl or $C_8$-$C_{18}$-alkenyl, $m=n=3$ and $R_3$ is hydrogen or methyl.

The aforesaid compounds are manufactured by oxalkylation according to known methods of compounds of the formula 2

$$R_1\text{—NH—}(CH_2)_m\text{—NH—}(CH_2)_2\text{—NH—}(CH_2)_n\text{—NH—}R_2 \quad (2)$$

The oxalkylation is preferably carried out at temperatures in the range of from 130° to 180° C. and under an alkylene oxide pressure of 2 to 5 bar. Suitable catalysts are, for example, sodium hydroxide and sodium methanolate.

According to the requirements the amines of the formula 2 can be treated first with propylene oxide and then with ethylene oxide or vice versa. Alternatively, mixtures of the two alkylene oxides can be used, in this case ethylene oxide and propylene oxide units are statistically distributed over the oxalkyl chains.

Products having especially good properties are obtained by reacting the amines of the formula 2 first with propylene oxide and then with ethylene oxide. It is also possible, of course, to react the amines of the formula 2 with one of the alkylene oxides only. In the latter case ethylene oxide is preferred. In the case of products of the formula 1 containing propylene oxide as well as ethylene oxide groups, it proved advantageous to choose the proportion of propylene oxide to ethylene oxide in a manner such that about 4 to 80% by weight of the sum of $o+p+q+r$ are propylene oxide and the balance is ethylene oxide. It is known that oxalkylation reactions yield products with more or less differing degree of oxalkylation and, therefore, the sum of $o+p+q+r$ indicates the mean value of the alkylene oxide content. Those compounds are preferred in which o, p, q, and r are approximately equal.

The diamines of the formula 2 used as starting products are prepared as described in German patent application No. P 29 38 710.8 by reacting alkylalkylene diamines of the formula $$R_1\text{—NH—}(CH_2)_m\text{—NH}_2$$

or $$R_2\text{—NH—}(CH_2)_n\text{—NH}_2$$

at room temperature or at elevated temperature up to about 50° C. in an alcohol as solvent with an aqueous solution of glyoxal. The bisaldimine of the formula $$R_1\text{—NH—}(CH_2)_m\text{—N=CH—CH=N—}(CH_2)_n\text{—NH—}R_2$$

obtained is then hydrogenated catalytically to give a compound of the formula 2.

The products according to the invention are brown, more or less viscous liquids which may become pasty or waxy with higher degree of oxalkylation.

The compounds and preferably those in which the sum of $o+p+q+r$ is in the range of from 60 to 450 are excellently suitable as dispersing agents for the manufacture of dispersions of pigments, dyestuffs and optical brighteners and for the formulation of plant protecting agents and pesticides. They can be used alone or in combination with other surface-active compounds and other additives and auxiliaries.

The anhydrous compounds according to the invention can be diluted with water or water/alcohol mixtures in any desired proportion and they are thus especially suitable for the manufacture of highly concentrated, flowable dispersions of organic and inorganic pigments.

Pigment dispersions of this type are prepared in known manner by dispersing the pigments, for example azo pigments, lacked azo pigments, triphenylmethane pigments, thioindigo pigments, perylene tetracarboxylic acid pigments, dioxazine pigments, quinacridone pigments, phthalocyanine pigments, or inorganic pigments, with the compounds of the invention with addition of ethylene glycol, water and optionally small amounts of other dispersing agents in a suitable dispersing device, for example a stirring mill or a divided trough kneader. When using a kneader the dispersing agent and a small amount of water are first introduced, the pigments are added in portions, optionally while adding small amounts of other dispersing agents, and the mixture is kneaded while having a viscous consistency. As soon as the desired fineness is obtained, for example, ethylene glycol, and water are added to adjust the desired color strength and consistency. With the use of a stirring mill the pigments are homogenized to give a paste in a mixture of the aforesaid dispersing agent, ethylene glycol and water and optionally small amounts of other dispersing agents by stirring. In general, the suspension obtained and capable of being pumped is milled in a continuous stirring mill with quartzite beads having a diameter of about 1 mm, if appropriate with several passages, until the desired fineness is reached. Thereafter, it can be adjusted to the desired color strength by adding water or, for example, ethylene glycol as water retention agent. The proportion of dispersing agent to pigment powder can vary within wide limits and, in general, it is in the range of from 0.1 to 0.2 part of dispersing agent for 1 part of dry pigment powder.

The pigment dispersions obtained in this manner can be used for coloring dispersion paints for internal and external use, in textile pigment printing or in aqueous inks for flexographic and gravure printing, especially in combination with alcohol additions. Excellent wetting and dispersing properties of the dispersing agents of the invention make it possible to use small amounts thereof, calculated on the pigment content of the dispersion. In flexographic and gravure printing light and brilliant shades are not affected by the slight natural color of the dispersing agents of the invention.

The polyether amines according to the invention, preferably those in which the sum of $o+p+q+r$ is from 4 to 150, and the salts thereof can also be used as corrosion inhibitors, demulsifiers and acid retarders in the exploitation and refining of mineral oil and natural gas.

In oil fields the equipment consists almost exclusively of simple carbon steel. As long as substantially pure crude oil flows through the pipes, as it is the case at the beginning of exploitation, the corrosion remains relatively low. When, however, water is conveyed as well, which at the beginning forms an emulsion with the crude oil and which is then separated by the addition of demulsifiers, pipes and apparatus in the lower sections are wetted by water. With increasing content of electrolytes, hydrogen sulfide and carbon dioxide the corrosivity of the water increases, whereby the service life of the equipment is significantly reduced.

This corrosion can be inhibited efficiently by cationic surfactants. An optimum inhibition of the oil field installations is possible by using corrosion inhibitors at the latest at the beginning of the addition of demulsifiers in order to minimize corrosion. Unfortunately, in most cases the corrosion inhibitors are added only after the occurence of serious corrosion damages. It proved especially advantageous to use as corrosion inhibitors cationic surfactants which do not only inhibit corrosion caused by the corrosive water but simultaneously demulsify the crude oil emulsions. Compounds of this type are successfully used according to DE-PS No. 2,238,995 for definite crude oils either alone or in combination with commercial, non ionic demulsifiers. It is desirable from an economical point of view to use cationic corrosion inhibitors and demulsifiers the combinations of which with known non ionic demulsifiers achieve an synergistic effect so that the amount of non ionic compound can be reduced.

Instead of the basic polyether polyamines of the formula 1 there can be used for this purpose the salts thereof as well, for example salts with anionic surfactants. Suitable anionic surfactants are, for example, $C_8$-$C_{30}$-alkylsulfonic acids, $C_8$-$C_{30}$alkyl ether sulfonic acids with 1 to 10 mols of ethylene oxide in the molecule, alkyl benzenesulfonic acids with 1 to 3 alkyl groups at the benzene nucleus each having 1 to 12 carbon atoms, alkylbenzene ether sulfonic acids having 1 to 3 $C_1$-$C_{12}$alkyl groups at the benzene nucleus and 1 to 10 mols of ethylene oxide in the molecule, alkylnaphthalene sulfonic acids with 1 to 3 $C_1$-$C_{12}$alkyl groups at the aromatic nucleus, acidic mono- and dialkyl-phosphoric acid esters with $C_8$-$C_{30}$alkyl groups acidic mono- and dialkyl ether phosphoric acid esters with $C_8$-$C_{30}$alkyl groups and 1 to 10 mols of ethylene oxide, and acidic mono- and dialkylphenol ether phosphoric acid esters with 1 to 3 $C_1$-$C_{12}$alkyl groups at the benzene nucleus and 1 to 10 mols of ethylene oxide in the molecule.

The salts with simple organic acids or inorganic acids, such as hydrochloric acid, sulfuric acid, phosphoric acid, or acetic acid, can also be used.

Especially preferred neutralization agents are dodecylbenzene sulfonic acid and acidic mono- and dinonylphenolpolyglycol ether phosphates.

When testing the properties of the substances according to the invention it has been found, surprisingly, that they are not only efficient corrosion inhibitors and demulsifiers but that they are also excellently suitable to retard, in well and reservoir stimulation processes, the attack of strong acids on the formation. To stimulate the production of oil wells and natural gas wells acid and preferably hydrochloric acid is pumped in many cases into the formation. The acid dissolves the mostly carbonate rocks of calcium and magnesium whereby the influx pores are enlarged so that larger amounts of oil or natural gas flow to the well and are extracted. Optimum production rates are obtained if the flow channels from the well into the reservoir are enlarged as far and as uniformly as possible far into the formation. This can be done satisfactorily only if the hydrochloric acid does not react completely in the direct vicinity of the well. This is the reason why so-called "retarded" acids are used, that is to say mixtures of hydrochloric acid and acetic acid, organic acids, gelated and emulsified acids. The compounds according to the invention considerably reduce the reaction speed of hydrochloric acid with, for example, limestone. When they are added in a concentration of up to 2% to the hydrochloric acid or the hydrochloric acid/acetic acid mixture, formulations of retarded acids are obtained in very simple manner.

The following examples illustrate the invention.

EXAMPLE 1

A 1 liter stainless steel autoclave is charged with 205 g (0.25 mol) of N,N'-di-tallow alkylamine propylethylene diamine and the substance is melted. After addition of 0.3 g of freshly pulverized sodium hydroxide, the autoclave is closed, scavenged twice with nitrogen and heated while stirring. Propylene is forced in at an internal temperature of 170° to 175° C. The internal pressure should not exceed 5 to 6 bar, if possible. When the pressure drops further propylene oxide is added, a total amount of 290 g (5 mols). When the addition is terminated, the autoclave is stirred for 2 hours at 170° C. After cooling the autoclave is repeatedly scavenged with nitrogen to remove propylene residues. About 490 g of a reddish brown, liquid product are obtained.

A 2 liter stainless steel autoclave is charged with 330 g (0.17 mol) of the product obtained. After addition of 0.2 g of freshly pulverized sodium hydroxide, closing of the autoclave and scavenging with nitrogen, the autoclave is heated to 130° to 140° C. while stirring and ethylene oxide is forced in. The ethylene pressure should not exceed 4.5 bar. A total amount of 1,237 g (28.1 mols) of ethylene oxide is added. The content of the autoclave is stirred for another 2 hours at 130° C., cooled to 60° C. and scavenged with nitrogen in order to remove the ethylene oxide residues. About 1,560 g of pasty brown final product of the formula 1 in which $R_1$ and $R_2$ are tallow alkyl, $R_3$ denotes methyl and hydrogen, $m=n=3$ and $o+p+q+r$ is 185 are obtained. The product has a molecular weight of about 9,400.

EXAMPLE 2

205 g (0.25 mol) of N,N'-di-tallow alkyl amino propyl-ethylene diamine are reacted as described in the first part of Example 1 with 435 g (7.5 mols) of propylene oxide. The total amount of liquid reaction product obtained is transferred to a 2 liter stainless steel autoclave and reacted, under the conditions specified in the second part of Example 1 with 880 g (20 mols) of ethylene oxide. About 1,520 g of brown, pasty product are obtained having a molecular weight of about 6,100 and the constitution as indicated in Example 1 with $o+p+q+r$ being 110.

EXAMPLE 3

82 g (0.1 mol) of N,N'-di-tallow alkyl aminopropylethylene diamine are melted in a 1 liter stainless steel autoclave. After addition of 0.15 g of freshly pulverized sodium hydroxide, the autoclave is closed, scavenged twice with nitrogen and heated. At a temperature of 130° to 140° C. a total amount of 420 g (9.5 mols) of ethylene oxide is added so that the internal pressure does not exceed 4.5 bar, if possible. When the addition is terminated, stirring is continued for 2 hours at 130° C. whereupon the mixture is cooled to 60° C. At that temperature the autoclave is scavenged with nitrogen in order to remove residues of ethylene oxide. About 500 g of brown, waxy product of the formula 1 are obtained in which $R_1$ and $R_2$ denote tallow alkyl, $R_3$ is hydrogen, $m=n=3$ and $o+p+q+r$ is 95. Its molecular weight is about 5,000.

EXAMPLE 4

346 g (0.135 mol) of N,N'-di-tallow alkyl-aminopropyl ethylene diamine, reacted with 30 mols of propylene oxide under the conditions specified in the first part of Example 2, are reacted as described in Example 1 with 1,295 g (29.4 mols) of ethylene oxide. About 1,630 g of brown, waxy product are obtained having a molecular weight of about 12,100 and the constitution indicated in Example 1 with $o+p+q+r$ being 238.

EXAMPLE 5

156 g (0.25 mol) of N,N'-dilauryl-aminopropyl ethylene diamine with an alkyl chain distribution of about 75% of $C_{12}$ and 25% of $C_{14}$ are reacted as described in Example 1 with 436 g (7.5 mols) of propylene oxide and thereafter with 869 g (19.7 mols) of ethylene oxide. About, 1,450 g of brown, pasty product of the formula 1 are obtained having a molecular weight of about 5,900 and the following constitution: $R_1=R_3=$lauryl alkyl, $R_3$ methyl and hydrogen, $m=n=3$ and $o+p+q+r=109$.

EXAMPLE 6

164 g (0.25 mol) of N,N'-di-coconut alkylaminopropyl ethylene diamine with an alkyl chain distribution of about 7% $C_8$, 6% $C_{10}$, 51% $C_{12}$, 19% $C_{14}$, 8% $C_{16}$ and 9% $C_{18}$ are reacted under the conditions specified in Example 1 with 436 g (7.5 mols) of propylene oxide and thereafter with 858 g (19.5 mols) of ethylene oxide. About 1,445 g of brown, pasty product of the formula 1 are obtained having a molecular weight of about 5,800 and the following constitution: $R_1=R_2=$coconut alkyl, $R_3=$methyl and hydrogen, $m=n=3$ and $o+p+q+r=108$.

EXAMPLE 7

In a 5 liter stainless steel autoclave 1,100 g (1.34 mols) of N,N'-di-tallow alkyl-aminopropyl-ethylene diamine are reacted under the conditions specified in Example 1 with 2,000 g (34.5 mols) of propylene oxide (1.5 g of NaOH as catalyst). 100 g (0.043 mol) of the brown, liquid reaction product are reacted, after addition of another 0.1 g of pulverized NaOH as catalyst, with 555 g (12.6 mols) of ethylene oxide as described in Example 1. About 650 g of brown, waxy product of the formula 1 are obtained having a molecular weight of about 15,000 and the following constitution: $R_1=R_2=$tallow alkyl, $R_3$ methyl and hydrogen, $m=n=3$ and $o+p+q+r=317$.

EXAMPLES OF APPLICATION

Example of Application 1

288 parts by weight of Pigment Red 14 (Colour Index No. 12,380), 54 parts by weight of the compound of Example 3 and about 80 parts by weight of water are kneaded for about 30 minutes in a divided trough kneader. When the desired fineness is reached, the viscous product is diluted with another 118 parts by weight of water and 60 parts by weight of ethylene glycol. The preparation obtained having a pigment content of 48% by weight is thinly liquid and has a long shelf life. It is excellently suitable for coloring aqueous paints and for making flexographic and gravure inks.

Example of Application 2

By using in Example of application 1 60 parts by weight of the compound of Example 2 instead of the compound of Example 3, a pigment preparation having equally good utilitarian properties is obtained.

Example of Application 3

250 parts by weight of a pigment, obtained by mixed coupling of diazotized 3,3'-dichlorobenzidine on acetoacetic anilide and acetoacetic p-anisidide in a ratio of 9:1 are kneaded for about 2 hours in a divided trough kneader with 45 parts by weight of the compound of Example 5 and about 65 parts by weight of water. When the desired fineness is reached, the viscous mass is diluted with 50 parts by weight of ethylene glycol and 140 parts by weight of water to a pigment content of 50%. The thinly liquid pigment preparation can be diluted with water or water-containing binder systems in any desired ratio. A pigment dispersion having equally good properties is obtained when the compound of Example 5 is replaced by 45 parts by weight of the compound of Example 1.

Example of Application 4

By using in Example of application 3 45 parts by weight of the compound of Example 6 instead of the compound of Example 5, a pigment dispersion is obtained having equally good utilitarian properties.

Example of Application 5

In a 1 liter stirring mill 80 parts by weight of Pigment Yellow 74 (Colour Index No. 11,741), 10 parts by weight of the compound of Example 4 and 70 parts by weight of water are milled for about 1 hour with the use of about 700 parts by weight of quartz beads (1 to 2 mm in diameter) as milling bodies. After milling 20 parts by weight of ethylene glycol are added to the milled material and the thinly liquid dispersion containing 40% by weight of pigment is separated from the milling bodies over a sieve. It is excellently suitable for use in aqueous flexographic and gravure printing inks.

Example of Application 6

45 Parts by weight of Pigment Red 184, 9 parts by weight of the compound of Example 7 and about 25 parts by weight of water are kneaded for about 1 hour in a divided trough kneader. When the desired finess is reached the viscous mass is further diluted by 11 parts by weight of water and 10 parts by weight of ethylene glycol. The preparation containing 45% by weight of pigment is thinly liquid and can be diluted with water or water-containing binder systems in any desired ratio.

The following examples are intended to demonstrate the efficiency of the compounds according to the invention as corrosion inhibitors, demulsifiers and acid retarders.

In the examples the following compounds are tested:

I: compound of the formula 1 with $R_1$ and $R_2$=tallow alkyl, $R_3$=H, m=n=3, sum of o, p, q, r=10;

II: compound of the formula 1 with $R_1$ and $R_2$=tallow alkyl, m=n=3, sum of o, p, q, r=15.8;

III: compound of the formula 1 with $R_1$ and $R_2$=tallow alkyl, $R_3$=H, m=n=3, sum of o, p, q, r=50;

IV: compound of the formula 1 with $R_1$ and $R_2$=tallow alkyl, $R_3$=H, m=n=3, sum of o, p, q, r=20; neutralized with 4 mols of dodecylbenzenesulfonic acid;

V: compound of the formula 1 with $R_1$ and $R_2$=tallow alkyl, $R_3$=H, m=n=3, sum of o, p, q, r=20; neutralized with 2 mols of dodecylbenzenesulfonic acid;

VI: compound of the formula 1 with $R_1$ and $R_2$=tallow alkyl, $R_3$=H, m=n=3, sum of o, p, q, r=20; neutralized with 4 equivalents of mono- and di-phosphoric acid esters of nonylphenol-tetraglycol ether;

VII: compound of the formula 1 with $R_1$ and $R_2$=tallow alkyl, m=n=3, alkylated with 20 mols of propylene oxide and 20 mols of ethylene oxide;

VIII: compound of the formula 1 with $R_1$ and $R_2$=tallow alkyl, m=n=3, oxalkylated with 20 mols of propylene oxide and 60 mols of ethylene oxide.

EXAMPLE 8

Corrosion Inhibition

Test method: Specimens of carbon steel are immersed for 7 hours at 60° C. into saline water (200 g/l) which is continuously stirred and through which carbon dioxide is bubbled and thereafter the loss in weight is determined. Under the above conditions the water contains at most about 0.5 ppm of oxygen. The value of protection in percent indicates the reduction of the metal corrosion with respect to the blank value.

| Product No. | protection in percent with the use of | |
|---|---|---|
| | 5 ppm | 25 ppm |
| I | 77 | 86 |
| II | 86 | 88 |
| III | 80 | 86 |
| IV | 73 | 82 |
| V | 81 | 87 |
| VI | 54 | 85 |
| VII | 37 | 71 |
| VIII | 60 | 76 |

EXAMPLE 9

Demulsification of Crude Oil

Test method: The crude oil emulsion to be tested is filled in the usual calibrated Torpedo glasses which are then heated in a water bath to demulsification temperature. Next, the demulsifiers are injected with fine dosing devices and the glasses are uniformly shaken by a machine for 5 minutes. For demulsification the glasses are placed again in the heated water bath. The separated amount of water in % at definite intervals is a measurement for the demulsification effect. The results are listed in the two following tables:

TABLE 1

Crude oil Tujmaza, water content 40 ml per 100 ml of emulsion, demulsification temperature 45° C., amount of demulsifier used 40 ppm

| Product | time (min) | | | | | |
|---|---|---|---|---|---|---|
| | 10 | 20 | 30 | 50 | 100 | 200 |
| I | 17 | 32 | 46 | 57 | 69 | 78 |
| II | 21 | 34 | 51 | 61 | 72 | 82 |
| III | 23 | 39 | 54 | 68 | 83 | 93 |
| IV | 32 | 45 | 57 | 72 | 81 | 94 |
| V | 36 | 48 | 62 | 77 | 88 | 97 |
| VI | 22 | 38 | 55 | 71 | 84 | 94 |
| VII | 42 | 53 | 64 | 78 | 89 | 98 |
| VIII | 29 | 46 | 59 | 75 | 86 | 98 |
| comparison* | 38 | 49 | 61 | 74 | 86 | 97 |

*For comparison a demulsifier according to FR-PS 1,069,615 consisting of 58% of propylene oxide and 42% of ethylene oxide is tested.

TABLE 2

Crude oil Ahrensheide, water content 58 g per 100 ml of emulsion, demulsification temperature 50° C., amount of demulsifier used 50 ppm

| Product | time (min) | | | | | |
|---|---|---|---|---|---|---|
| | 10 | 20 | 30 | 50 | 100 | 200 |
| I | 8 | 19 | 29 | 47 | 61 | 71 |
| II | 11 | 23 | 35 | 54 | 64 | 75 |
| III | 13 | 25 | 32 | 56 | 68 | 78 |
| IV | 12 | 23 | 41 | 58 | 71 | 82 |
| V | 10 | 22 | 31 | 53 | 65 | 75 |
| VI | 11 | 24 | 36 | 56 | 67 | 76 |
| VII | 22 | 37 | 48 | 66 | 81 | 90 |
| VIII | 33 | 45 | 58 | 77 | 90 | 96 |
| comparison | 27 | 41 | 51 | 72 | 86 | 91 |

EXAMPLE 10

Retardation of Hydrochloric Acid

The acid of definite temperature is poured into a vessel containing pieces of limestone, the carbon dioxide set free is collected and the time is measured until a definite volume (500 cc) is obtained. First a blind value is determined and then two measurements each are carried out with the same limestone material. The retardation is the relation of the times measured with the substances of the invention to the blind value

| Concentration (%) | retardation with compound | |
|---|---|---|
| | I | II |
| 0.2 | 5.0 | 4.7 |
| 0.4 | 9.1 | 9.2 |
| 0.6 | 11.5 | 10.5 |
| 0.8 | 13.5 | 12.5 |
| 1.0 | 16.4 | 15.6 |
| 1.2 | 17.6 | 16.8 |
| 1.4 | 18.4 | 17.4 |
| 1.6 | 19.6 | 18.9 |
| 1.8 | 21.5 | 21.8 |
| 2.0 | 22.0 | 22.6 | test temperature 60° C.

What is claimed is:

1. Polyether polyamines of the formula

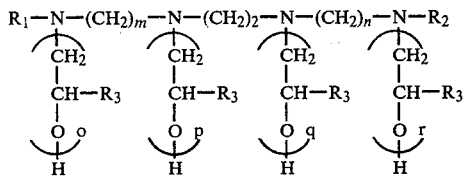

in which $R_1$ and $R_2$ are identical or different and denote $C_8$–$C_{30}$-alkyl, $C_8$–$C_{30}$-alkenyl or $C_8$–$C_{24}$-alkoxypropyl, m and n are 2 or 3, $R_3$ is hydrogen or methyl and the sum of $o+p+q+r$ is an integer from 10 to 600, and the salts thereof.

2. Polyether polyamines as claimed in claim 1 in which $R_1$ and $R_2$ are identical and denote $C_8$–$C_{18}$-alkyl, or $C_8$–$C_{18}$-alkenyl, $m=n=3$ and $R_3$ is hydrogen or methyl and the sum of $o+p+q+r$ is an integer in the range of from 10 to 150.

3. Compounds as claimed in claim 1, in which $R_1$ and $R_2$ are identical and denote $C_8$–$C_{18}$alkyl, $C_8$–$C_{18}$-2-hydroxyalkyl, or $C_8$–$C_{18}$alkenyl, $R_3$ is hydrogen or methyl, $m=n=3$ and the sum of $o+p+q+r$ is in the range of from 60 to 450.

4. Polyether polyamines as claimed in claims 1 or 2 in the form of their dodecylbenzene sulfonate and mono- or di-nonylphenol polyethylene glycol phosphate.

* * * * *